UNITED STATES PATENT OFFICE.

ABELARDO F. CAMPA Y MENENDEZ, OF HABANA, CUBA.

INCOMBUSTIBLE AND WATERPROOF PRODUCT FOR USE IN CONSTRUCTIONS.

1,305,993. Specification of Letters Patent. Patented June 10, 1919.

No Drawing. Application filed November 6, 1917. Serial No. 200,496.

*To all whom it may concern:*

Be it known that I, ABELARDO F. CAMPA Y MENENDEZ, a subject of the King of Spain, residing at #216 Neptuno street, Habana, Cuba, have invented new and useful Improvements in Incombustible and Waterproof Products for Use in Constructions, of which the following is a specification.

The different kinds of blocks, tiles, slabs, flags, and lozenge shaped paving material, and such materials, which are employed in constructions, are well known, and are generally manufactured of plastic materials such as clay, cement, concrete, and may in addition to these plastic materials as ingredients contain asbestos and in many cases metallic framework.

The use of such blocks, etc., although offering much resistance, does not always result economically, for the lack ofttimes of certain determined prime materials, and further because their application is not always the same, which requires a special construction, and consequently a selection of the prime materials.

For the purpose of avoiding all this, I have invented an incombustible and water-proof product for employment in constructions.

This product is especially adapted for roofs, ornamentations, ceilings, wall surfaces and to make dividing partitions and walls, although it is not limited to these adaptations.

To obtain this product, I employ the residue of any such material as paper, cardboard, cloths and rags, and wood saw dust, either alone or from a mixture of all of them.

From these residua, either from one or from all, is taken a quantity sufficient to make a block or blocks of the desired size and is subjected to a bath of a solution composed of fifty grams of caustic potash, and fifty grams of chlorid of calcium in a liter of water, for twelve hours.

Having withdrawn the residues from the bath, they are washed in distilled water and dried in any convenient manner, and are then immediately shredded into small pieces, or ground up into a paste.

After being reduced to this, it is subjected to a treatment of an incombustible substance, which is formed of the following:

| | |
|---|---|
| Borax | 25 grams |
| Carbonate of sodium | 50 grams |
| Carbonate of ammonium, neutral | 50 grams |
| Triammonium phosphate | 50 grams |
| Sulfate of ammonium | 50 grams |
| Chlorid of ammonium | 50 grams |
| Boiled water | 725 grams | and when they are thoroughly impregnated with the above substance, they are pressed out and dried.

Having carried out the foregoing mentioned operations, the product is made water-proof, or impermeable, for which purpose is prepared a solution of alcohol and gum-lac, in the following proportions: one liter of alcohol of forty degrees and three hundred grams of gum-lac.

Into this impermeable solution, is thrown all residue, and after being thoroughly beaten up, forms a paste which is then placed into molds, and pressed, and dried by any suitable means and then subjected to the action of furnaces for a period of about ten minutes, by which is obtained the completion of its consistency.

Having described the foregoing invention, I make the following claim:

1. A process of making building blocks which consists in reducing a fibrous material to a paste, treating the same with a fireproofing solution, pressing out the resulting paste and drying the same, and placing the dried paste in a waterproofing solution and thoroughly heating the same, and then pressing the paste into blocks and subsequently drying them.

2. A process of making building blocks which consists in shredding a fibrous material, treating the same with a fireproofing solution, drying the material, placing the material in a waterproofing solution and thoroughly heating the same, and then pressing the shredded material into blocks and subsequently drying them.

In testimony whereof I have signed my name to this specification.

ABELARDO F. CAMPA Y MENENDEZ.